United States Patent

[11] 3,631,898

| | | |
|---|---|---|
| [72] | Inventor | Alfred H. Harley<br>P.O. Box 6143, Greensboro, N.C. 27405 |
| [21] | Appl. No. | 1,987 |
| [22] | Filed | Jan. 13, 1970 |
| [45] | Patented | Jan. 4, 1972<br>Continuation of application Ser. No. 737,253, May 21, 1968, now abandoned, and a continuation of 406,831, Oct. 27, 1964, now abandoned. This application Jan. 13, 1970, Ser. No. 1,987 |

[54] INSULATING PIPE JOINT FITTING AND METHOD OF MAKING SAME
4 Claims, 9 Drawing Figs.

[52] U.S. Cl. ................................................ 138/157,
51/327, 83/5, 156/153, 156/228, 156/258, 156/264, 161/159
[51] Int. Cl. ........................................... F16l 59/02
[50] Field of Search ........................................... 156/153, 228, 257–258, 264; 161/159–161; 138/147, 151, 156–158, 161, 141, 145, 146, 155; 143/85, 171; 51/3, 98, 101, 109, 125, 326–327; 83/5; 117/136–138; 264/152, 162, 321

[56] References Cited
UNITED STATES PATENTS

| 2,717,848 | 9/1955 | Jaye | 138/157 |
|---|---|---|---|
| 2,780,896 | 2/1957 | Jaye | 51/3 X |
| 2,788,304 | 4/1957 | Scovronek | 138/157 |
| 2,841,193 | 7/1958 | Petrofsky | 143/85 |
| 3,103,254 | 9/1963 | Stedman | 117/137 X |
| 3,204,668 | 9/1965 | Emerson et al. | 138/158 |
| 3,231,085 | 1/1966 | Flores et al. | 138/161 X |
| 3,191,632 | 6/1965 | Keiding | 138/151 |
| 3,415,287 | 12/1968 | Heslop et al. | 138/141 |

FOREIGN PATENTS

| 859,599 | 1/1961 | Great Britain | 138/157 |

*Primary Examiner*—Harold Ansher
*Attorney*—David Rabin

ABSTRACT: An insulating pipe joint fitting formed from a block of insulating material in which the block is cut to a rectangular configuration adequate to cover and insulate at least one-half of a pipe joint fitting, grinding the insulating covering to the contour of one-half of the exterior of the pipe joint fitting and then grinding the insulating covering to form a contoured cavity for cooperatively receiving one-half of the fitting to be covered, and forming a complementary insulating covering in the same manner to be received cooperatively by the first half insulating covering and a pipe joint therein. The two halves of the insulating covering may be adhered over the pipe joint fitting, and a contoured shield positioned over the insulating coverings.

PATENTED JAN 4 1972  3,631,898

INVENTOR
ALFRED H. HARLEY

BY
David Rabin
ATTORNEY

INSULATING PIPE JOINT FITTING AND METHOD OF MAKING SAME

This application is a continuation of application, Ser. No. 737,253 filed May 21, 1968 and Ser. No. 406,831, filed Oct. 27, 1964, both applications being now abandoned. This invention relates to pipe covering and relates more particularly to a method and a product for insulating pipes and fittings through which hot or cold fluids will flow.

It is conventional practice in covering steam fittings and refrigeration fittings to insulate them by applying an asbestos cement or other suitable moldable insulating material to the pipes and joints, and thereafter wrapping the moldable asbestos cement or other deformable material to the desired contour within a soft fiber glass blanket after which the blanket may be enveloped or covered by a woven canvas fabric that is usually hand sewn to seal the canvas around the joint or fitting. This practice is not only costly and time consuming but the uniformity of the finished fittings cannot be maintained throughout an installation. Frequently the insulation materials surrounding pipe and fittings become damp due to condensation as there is no provision made for a vapor seal thereby reducing the insulating properties and characteristics of the materials and accelerating the deterioration of the insulating materials.

It is, therefore, an objective of this invention to provide a pipe fitting insulating block that may be readily secured to a pipe fitting for insulating properties installable with minimum skill and optimum insulating characteristics.

Still another objective of this invention is to provide a pipe fitting having insulating characteristics and made from such materials as polyurethane, polystyrene, foamed glass, magnesia, calcium silicate, among other materials, originally formed from a block, without application of a deformable mass to a pipe joint to be covered while enabling the machined fitting to be installed and retained on the fitting.

A further objective of this invention is to provide a vapor barrier shield to pipe fittings or joints facilitating installation and reducing appreciably the time consumed for installation of pipe and joint covering.

A further objective of this invention is to provide a foamed plastic insulation material with a coating that will reduce the flammability by imparting a fire protective shield thereby reducing the combustibility of the insulating material.

Other objects and many of the attendant advantages of this invention will become more readily apparent to those skilled in the insulation art from the following detailed description of the invention taken in conjunction with the accompanying drawing and wherein.

Figure 1:
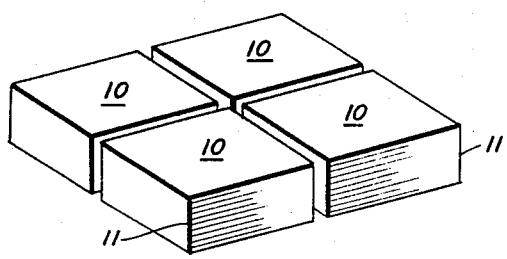
FIG. 1 is a perspective view of a block of suitable insulating materials cut into four smaller blocks preparatory for machining to the desired contour.
Figure 2:
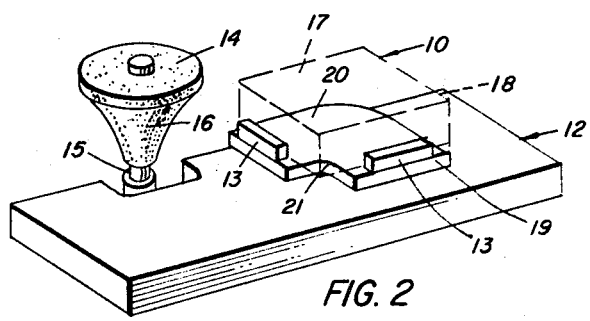
FIG. 2 is a schematic representation of a jig or movable fixture for supporting a block of insulating material for presentation to a suitable grinding contoured wheel.

Referring to the drawing and more particularly to FIGS. 1 and 2, there is illustrated a block of insulating material such as polyurethane, polysytrene, foamed glass, magnesia, calcium silicate or other suitable material formed into four different rectangular blocks 10 which have been cut from a larger block of the material in which the depth 11 will be sufficient to provide adequate insulating characteristics to the joint or fitting to be covered. In the present description, the procedure to be described will be confined to the formation of a covering for an elbow, however, essentially the same procedure may be employed for other fittings by modifying the contoured grinding wheels and jigs employed. The individual block 10 is mounted on a jig 12 and supported by the guide members 13 for presentation to the radiused or contoured grinding wheel head 14 that is mounted on a motor driven arbor 15 with the grinding surface 16 on the grinding wheel 14 having a contour of the desired configuration to be imparted to the block 10. The carriage 12 is supported for horizontal reciprocation on a suitable table for presentation to the contoured surface 16 of the wheel 14 which will first provide the desired contour to block side 17 and upon 90° rotation the side 18 will then be presented to the grinding wheel 14. It is desirable that the template 19 be utilized as a guide for the configuration of the covering member to be formed and the outer arcuate configuration 20 of the elbow as well as the inside configuration 21 may be used as a guide during grinding.

Figure 3:
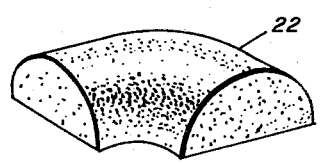
FIG. 3 is a perspective view of a partially finished insulating elbow joint.
Figure 4:
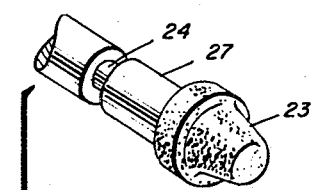
FIG. 4 is a perspective view of a partially finished elbow joint of FIG. 3 and a contour grinding wheel to impart the desired contour to the interior of the insulating elbow for receiving an elbow joint.
Figure 5:
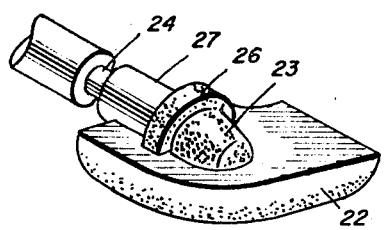
FIG. 5 is a perspective view illustrating the contoured grinding wheel introduced into the insulating elbow to present the desired elbow-receiving contour to one portion of the covering.
Figure 6:
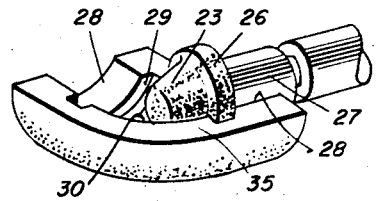
FIG. 6 is a perspective view of the elbow of FIG. 5 illustrating the elbow being ground to form the complementary portion of the elbow by grinding the wheel at the position 90° from that shown in FIG. 5.

The partially machined elbow 22 as shown in FIG. 3 has the exterior configuration desired and is the result of the grinding operations performed on the block 10 utilizing the contoured wheel 14. The partially completed elbow 22 is then inverted, as shown in FIG. 4, to receive the contoured grinding wheel 23 that is mounted on the motor driven arbor 24. The flat surface 25 of the elbow 22 is then presented to the contoured grinding wheel 23 in which the flange 26 will correspond to the boss or flange that may be employed on the specific fitting elbow to be covered by the insulating elbow 22. The short cylindrical portion 27 of the grinding wheel 23 will function to permit the covering joint 22 to receive a short portion of a pipe to be threadably received or welded to the elbow joint that is to be covered by the insulating joint 22, as shown in FIG. 5. Upon completion of one side of the joint as shown in FIG. 5, the other side will be similarly machined or ground as shown in FIG. 6 in order to receive a contoured elbow into the insulating cover. The half cylindrical section 28 formed by the portion 27 of the grinding wheel communicates with the flange-receiving recess 29 which in turn communicates with the relief portion 30 for the elbow portion of the joint. The member 22 is either rotated 90° or the grinding wheel may be so rotated in order to form the other portion in the elbow as shown in FIG. 6.

Figure 7:
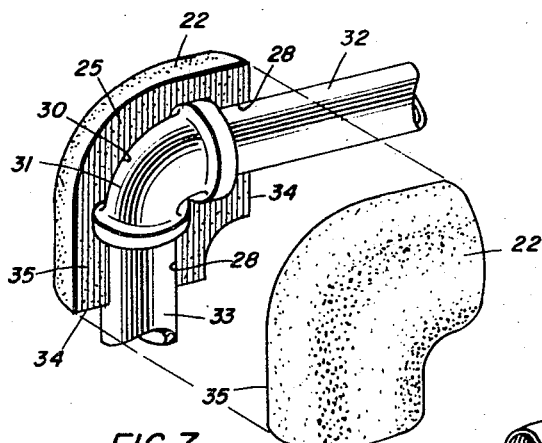
FIG. 7 is an exploded perspective view of a pair of complementary insulating elbows and a pipe elbow with joining pipes presenting the fittings in relative position.
Figure 8:
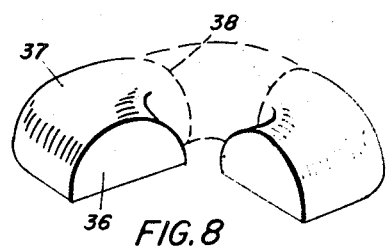
FIG. 8 is a perspective view of a mold or pattern for forming a vinyl surface for the insulating fittings.
Figure 9:
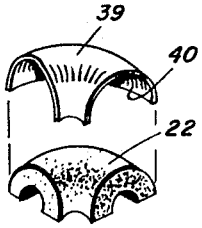
FIG. 9 is an exploded perspective view of a vinyl covering to be adhered to the exterior surface of an insulating elbow.

There is illustrated in FIG. 7 a pair of complementary insulating elbows formed by utilizing the process and in which the elbow 31 is received in the elbow-receiving recess with one end of pipe 32 being received in one end of elbow 31 and one end of pipe 33 being received in the other end of elbow 31, short sections of each pipe being received in the short semicylindrical portions adjacent the edges 34 of each half covering member 22. It has been found desirable to coat the interior surface 35 of each half joint with an adhesive material that will remain active to receive a cooperating half-member and support the two together adhesively for a sufficient time to enable the covering applicator to make up a section without necessitating any stapling or wiring or applying any additional materials, unless desirable, before applying an exterior coating or covering to the joint.

In those instances when a flammable insulating material is employed, it has been found desirable to treat polyurethane insulating material with sodium silicate either by coating or spraying this sodium silicate on the formed urethane joint with sufficient protective coating on the exposed surface to retain the coating thereon, thus improving the fireproof qualities and life of the material. It is desirable that the sodium silicate bonds itself to the foam plastic insulation material. The coating solution of silicate of soda or sodium silicate may vary in composition from $Na_2O \cdot 2SiO_2$ to $Na_2O \cdot 4SiO_2$, It will be readily appreciated that 45° elbows, tees, unions, couplings, and other fittings including valves, may be covered employing the same method for forming the insulating covering by a properly designed grinding or cutting wheel having the requisite contours. It has been found desirable to utilize for the contoured grinding wheel, a wood core shaped to the desired contour with the surface properly treated to support adhesively a suitable grit or other grinding material depending upon the insulating material to be worked.

It is desirable to provide a covering for the insulating fitting that is impervious to moisture in order to form a vapor barrier particularly for insulation of refrigeration or cold lines and for providing a relatively tough protective surface for guarding the relatively soft insulating materials used on the pipe fittings. A vacuum molding process is employed to provide the desired contour in a vinyl sheet over a form 36 with the vinyl covering 37 positioned over the form 36 after which the contoured form 37 may be cut along suitable lines 38 and trimmed so as to completely cover the exterior surface of the fitting 22 by the shield 39 of tough vinyl. It is also desirable to utilize an adhesive material 40 on the under surface of the shield 39 which will adhere to the exterior surface of the fitting 22. In some instances it may be desirable to cover the vinyl shield with additional covering material such as canvas depending upon the type installation employed.

It will be readily apparent that modifications and variations may be made to the type materials employed and their configurations without departing from the purpose and spirit of this invention and such modifications and variations are contemplated within the scope of the appended claims.

What is claimed is:

1. The method of fabricating an insulating pipe joint fitting from block material comprising the steps of cutting a block of insulating material to a rectangular configuration of a size sufficient to cover and insulate at least one-half of a pipe joint fitting, grinding the insulating covering generally to the contour of one-half of the exterior of the pipe joint fitting to be covered by displacing the block material relative to an abrading surface, positioning the block material in a stationary manner, displacing an abrading surface normal to the stationary block, removing portions of the block and forming a contoured axially curved internal cavity of varying depths by engaging the block material with one or more abrading surfaces, forming a complementary insulating covering in the same manner to be received cooperatively by the first half insulating covering and a pipe joint therein, adhering the two halves of the covering over a fitting to be covered, and adhering a contoured shield over the entire exterior portions of said insulating halves.

2. The method of fabricating an insulating pipe joint fitting from block material as claimed in claim 1, and further including the step of molding the shield to conform substantially to the exterior contour of the adhered halves of the covering, said contoured shield being formed of a vinyl polymer resin and adhered to the exterior surface of said insulating halves.

3. The method of fabricating an insulating pipe joint fitting as claimed in claim 1, and coating the ground insulating halve surfaces with sodium silicate, and drying the sodium silicate in situ to form a superficial fire-retarding coating on said insulating halves.

4. A machine insulating pipe joint covering of foamed material comprising two complementary halves, each of said halves having an exterior surface conforming generally to the exterior contour of the fitting to be insulated, an interior axially curved cavity of varying depths conforming substantially to the exterior configuration of the fitting to be covered for cooperatively receiving the pipe fitting therein, means on at least one of the halves for adhesively securing the two halves together, a molded, shape-retaining flexible plastic impervious shell conforming substantially to the exterior contour of the two halves for covering the complete exterior portions of the two halves and adhesively secured thereto, and a coating of sodium silicate covering the exterior surface of each half.

* * * * *